United States Patent
Matthews et al.

(10) Patent No.: US 10,239,145 B2
(45) Date of Patent: Mar. 26, 2019

(54) SYNCHRONIZED MAGNETIC ARC STEERING AND WELDING

(75) Inventors: William T Matthews, Chesterland, OH (US); Steven R Peters, Huntsburg, OH (US); Stephen R Cole, Bonita, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1895 days.

(21) Appl. No.: 13/438,703

(22) Filed: Apr. 3, 2012

(65) Prior Publication Data
US 2013/0256288 A1    Oct. 3, 2013

(51) Int. Cl.
*B23K 9/08*    (2006.01)
*B23K 9/073*    (2006.01)
*B23K 9/09*    (2006.01)

(52) U.S. Cl.
CPC .............. *B23K 9/0737* (2013.01); *B23K 9/08* (2013.01); *B23K 9/09* (2013.01)

(58) Field of Classification Search
CPC ........ B23K 9/0737; B23K 9/08; B23K 9/093; B23K 9/091; B23K 9/028; B23K 9/025; B23K 9/02; B23K 9/0052
USPC .................................. 219/124.5, 124.1, 123
See application file for complete search history.

(56) References Cited

U.S. PATENT DOCUMENTS

| | | | |
|---|---|---|---|
| 1,740,381 A * | 12/1929 | Weed | 219/123 |
| 1,792,243 A * | 2/1931 | Richter | 315/343 |
| 1,854,536 A * | 4/1932 | Wilson | 219/123 |
| 2,743,342 A * | 4/1956 | Bettis et al. | 219/123 |
| 2,756,311 A * | 7/1956 | Persson et al. | 219/74 |
| 2,844,705 A * | 7/1958 | Bowman et al. | 219/61 |
| 2,920,183 A * | 1/1960 | Greene | 219/123 |
| 2,994,763 A * | 8/1961 | Schultz | 219/123 |
| 3,102,946 A * | 9/1963 | Zygmunt | 219/123 |
| 3,174,027 A | 3/1965 | Manz | |
| 3,433,924 A * | 3/1969 | Sevenco | 219/123 |
| 3,551,637 A * | 12/1970 | Lampson | 219/123 |
| 3,626,145 A * | 12/1971 | Jackson | 219/123 |
| 3,727,822 A | 4/1973 | Umbaugh | |
| 3,885,123 A * | 5/1975 | Sciaky et al. | 219/123 |
| 4,019,016 A | 4/1977 | Friedman et al. | |
| 4,048,436 A * | 9/1977 | Hiratake et al. | 373/22 |
| 4,095,085 A * | 6/1978 | Tomita et al. | 219/123 |
| 4,194,106 A * | 3/1980 | Rudaz et al. | 219/123 |

(Continued)

FOREIGN PATENT DOCUMENTS

CN    101032778 A    9/2007
CN    102186618 A    9/2011

(Continued)

OTHER PUBLICATIONS

U.S. Appl. No. 13/792,416, filed Mar. 11, 2013, Auto Steering in a Weld Joint.

(Continued)

*Primary Examiner* — Jimmy Chou
(74) *Attorney, Agent, or Firm* — Perkins Coie LLP (57) ABSTRACT

A system and method of welding is provided where a pulse welding power supply is coupled with a magnetic field power supply such that a magnetic field can be generated proximate to a welding arc during pulse welding. During pulse welding a magnetic field is used to direct the welding arc and a droplet being transferred in the arc.

16 Claims, 7 Drawing Sheets

(56) References Cited

U.S. PATENT DOCUMENTS

| | | | |
|---|---|---|---|
| 4,280,137 A | 7/1981 | Ashida et al. | |
| 4,301,355 A * | 11/1981 | Kimbrough et al. | 219/137 PS |
| 4,366,362 A * | 12/1982 | Ohta et al. | 219/123 |
| 4,408,114 A | 10/1983 | Nakata et al. | |
| 4,485,292 A * | 11/1984 | Mizuno et al. | 219/123 |
| 4,491,718 A | 1/1985 | Cook et al. | |
| 4,595,820 A | 6/1986 | Richardson | |
| 4,628,182 A * | 12/1986 | Hori et al. | 219/130.51 |
| 4,791,270 A | 12/1988 | Nelson et al. | |
| 4,904,843 A * | 2/1990 | Hori et al. | 219/137 PS |
| 4,975,558 A * | 12/1990 | Lukens et al. | 219/124.34 |
| 5,171,966 A | 12/1992 | Fukuoka et al. | |
| 5,278,390 A | 1/1994 | Blankenship | |
| 5,932,121 A * | 8/1999 | Manabe et al. | 219/123 |
| 6,207,927 B1 * | 3/2001 | Mita et al. | 219/130.51 |
| 6,310,320 B1 | 10/2001 | Kraus et al. | |
| 6,331,694 B1 | 12/2001 | Blankenship | |
| 6,337,455 B1 * | 1/2002 | Yamaguchi | 219/76.14 |
| 6,617,547 B1 * | 9/2003 | Abdurachmanov | 219/123 |
| 6,621,049 B2 * | 9/2003 | Suzuki | 219/130.01 |
| 6,657,163 B1 | 12/2003 | Blankenship et al. | |
| 7,307,240 B2 | 12/2007 | Holverson et al. | |
| 7,378,612 B2 | 5/2008 | Takahashi et al. | |
| 7,842,904 B2 | 11/2010 | Nakata et al. | |
| 2003/0024916 A1 * | 2/2003 | Wright et al. | 219/123 |
| 2004/0118826 A1 * | 6/2004 | Schmitt | 219/123 |
| 2005/0269306 A1 | 12/2005 | Fulmer et al. | |
| 2007/0056942 A1 | 3/2007 | Daniel et al. | |
| 2007/0158324 A1 | 7/2007 | O'Donnell | |
| 2007/0210048 A1 * | 9/2007 | Koshiishi et al. | 219/130.51 |
| 2007/0241087 A1 | 10/2007 | Peters | |
| 2008/0011727 A1 | 1/2008 | Peters | |
| 2008/0053978 A1 | 3/2008 | Peters et al. | |
| 2008/0156782 A1 | 7/2008 | Rice et al. | |
| 2008/0206594 A1 | 8/2008 | Fukuda et al. | |
| 2008/0230528 A1 | 9/2008 | Wilhelm | |
| 2009/0242533 A1 * | 10/2009 | Yamazaki et al. | 219/130.32 |
| 2010/0096373 A1 | 4/2010 | Hillen et al. | |
| 2010/0096375 A1 * | 4/2010 | Daniel | 219/137.31 |
| 2010/0200553 A1 | 8/2010 | Yamazaki et al. | |
| 2010/0213179 A1 | 8/2010 | Peters | |
| 2010/0230389 A1 | 9/2010 | Hsu et al. | |
| 2011/0132877 A1 | 6/2011 | Miller et al. | |
| 2011/0174784 A1 * | 7/2011 | Kamei | 219/74 |
| 2011/0259853 A1 * | 10/2011 | Yamazaki et al. | 219/74 |
| 2013/0043219 A1 | 2/2013 | Peters et al. | |
| 2013/0112675 A1 * | 5/2013 | Peters | 219/130.51 |
| 2013/0125685 A1 | 5/2013 | Miller et al. | |
| 2013/0228555 A1 | 9/2013 | Peters et al. | |
| 2014/0001166 A1 | 1/2014 | Peters et al. | |
| 2014/0083987 A1 | 3/2014 | Dodge | |

FOREIGN PATENT DOCUMENTS

| | | | |
|---|---|---|---|
| DE | 102007017225 A1 | 9/2008 | |
| GB | 1286444 A * | 8/1972 | B23K 9/04 |
| GB | 2154028 A * | 8/1985 | B23K 9/08 |
| JP | 57-39077 A | 3/1982 | |
| JP | 58-205680 A | 11/1983 | |
| JP | 59-87981 A | 5/1984 | |
| JP | 63-192562 A | 8/1988 | |
| JP | 2-59179 A | 2/1990 | |
| JP | 10-193116 A | 7/1998 | |
| JP | 11-291038 A | 10/1999 | |
| JP | 2011098375 A | 5/2011 | |
| SU | 538842 A1 | 12/1976 | |
| SU | 1637971 A1 | 3/1991 | |
| WO | WO 2013/150364 A1 | 10/2013 | |

OTHER PUBLICATIONS

U.S. Appl. No. 13/834,485, filed Mar. 15, 2013, Tandem Hot-Wire Systems.

U.S. Appl. No. 13/834,179, filed Mar. 15, 2013, Tandem Hot-Wire Systems.

Henon, Barbara K. et al., "Automated Narrow Gap GTAW—Driving Down the Cost of Energy," Arc Machines, Inc., 3 pages, prior to Jun. 27, 2012.

International Application No. PCT/IB2013/001365, International Search Report & Written Opinion, 11 pages, dated Dec. 17, 2013.

International Application No. PCT/IB2013/001384, International Search Report & Written Opinion, 9 pages, dated Nov. 26, 2013.

International Application No. PCT/IB2013/000583, International Search Report & Written Opinion, 9 pages, dated Sep. 20, 2013.

International Application No. PCT/IB2014/000283, International Search Report, 5 pages, dated Sep. 4, 2014.

International Application No. PCT/IB2014/000376, International Search Report & Written Opinion, 9 pages, dated Sep. 24, 2014.

International Application No. PCT/IB2014/000383, International Search Report & Written Opinion, 9 pages, dated Sep. 24, 2014.

* cited by examiner

SYNCHRONIZED MAGNETIC ARC STEERING AND WELDING

BACKGROUND OF THE INVENTION

Field of the Invention

Devices, systems, and methods consistent with the invention relate to welding, and more specifically related to welding employing synchronized magnetic arc steering with either a GMAW or GTAW operation.

Description of the Related Art

It is known that magnetic fields are created during the welding process because of the flow of electric current through the welding arc and in the work piece. The presence of these magnetic fields can sometimes cause issues such as arc blow, where the arc becomes unstable during the welding operation. Thus, procedures and equipment have been developed to try and stabilize or move a welding arc using a separate magnetic field.

BRIEF SUMMARY OF THE INVENTION

An exemplary embodiment of the present invention is a welding system and method for welding having a welding power supply which outputs a welding current signal to an electrode so that a welding arc is generated between said electrode and a workpiece, where the welding current signal has a plurality of current pulses. Also provided is a magnetic field power supply which outputs a magnetic field current signal to a magnetic steering device, where the magnetic field current signal has a plurality of magnetic current pulses. The magnetic steering device is positioned adjacent to the welding arc and the magnetic steering device uses the magnetic field current signal to generate a magnetic field to move the welding arc during welding. Further, the magnetic field current signal is synchronized to the welding current signal such that the plurality of the magnetic current pulses are synchronized with respect to the plurality of current pulses of the welding signal.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
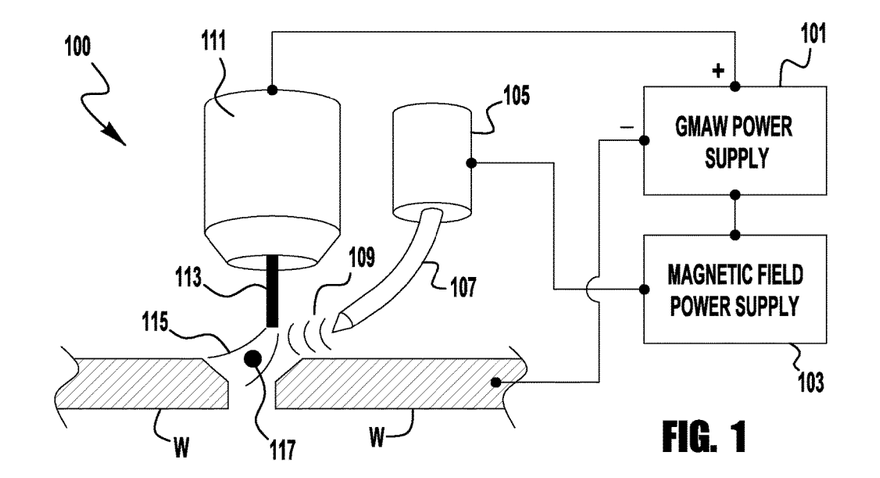
FIG. 1 illustrates a diagrammatical representation of a welding system in accordance with an exemplary embodiment of the present invention.

FIG. 1 depicts an exemplary welding system 100 in accordance with an embodiment of the present invention. The system 100 includes at least one welding power supply 101, which is shown as a GMAW type power supply. The power supply 101 is capable of welding with a pulsed welding waveform and directs the welding current through a welding torch 111 into a consumable welding electrode 113 which is deposited into a weld puddle via droplet transfer, or a similar transfer operation. The system 100 also includes a magnetic field power supply 103 which is coupled to a magnetic field generation device 105 having at least one magnetic field probe 107 which is positioned proximate to a welding arc 115 during a welding operation.

As is understood by those in the art, a GMAW-type welding operation uses a pulsed welding waveform to create a welding arc 115 and melt a portion of a welding electrode 113. During a pulse of the waveform a molten droplet 117 of the electrode 115 is transferred from the electrode—through the arc 115—and into a weld puddle. Typically, the molten droplet 117 is transferred during a peak in the welding current pulse. Because such a welding operation is so well known, it will not be discussed in detail herein. It is understood that GMAW-type welding or pulse welding, as referenced herein, refers to any welding in which a pulsed welding waveform is used, including but not limited to GMAW, MIG, FCAW, MCAW type welding.

It is noted that for purposes of clarity and efficiency many of the discussions herein reference GMAW type welding, as shown in the Figures. However, embodiments of the present invention are not limited to use with GMAW type welding systems. Specifically, embodiments of the present invention can also be used with TIG/GTAW (gas tungsten arc welding) systems without departing from the scope and spirit of the present application. Similar to the discussions herein, the magnetic field is used to control the movement of the TIG arc during welding. It is known that in TIG/GTAW welding the electrode used to create the arc is not the consumable (as in GMAW processes), and in embodiments of the invention the magnetic field controls the movement of this arc. Therefore, while many of the discussions and figures herein reference and depict GMAW systems and processes, this is intended to be exemplary and not to limit embodiments of the present invention to GMAW type processes. For example, in each of FIGS. 1, 3, 7, and 9 the GMAW power supplies (e.g., 101) and torches (e.g., 111) can be replaced with GTAW power supplies and GTAW electrodes without departing from the scope and spirit of the present invention. It is, of course, noted that the delivery of the consumable would not be through the GTAW torch, but via known means. Furthermore, the current waveforms discussed and shown herein, and the relationships between the magnetic field current and welding current, are similarly applicable to GMAW and GTAW type welding operations. Of course, it is known that during GMAW type welding the consumable providing the molten droplets is also the electrode, while in GTAW type welding the consumable is separate from the electrode.

Returning to FIG. 1, the system 100 includes a magnetic field power supply 103 and a magnetic field generation device 105. The power supply 103 directs an electrical current to the device 105 so that a magnetic field 109 is generated by the probe 107. The magnetic field power supply 103 can be any type of power supply capable of providing a current to a magnetic field device to create a magnetic field. The power supply should be capable of providing high frequency and precise control of the magnetic field generation current so that it may react appropriately with a pulse welding power supply. Alternatively, the power supply 103 can be of a type that follows signals from the welding power supply's 101 logic or control signaling, such that the power supply 103 can use signaling from the welding power supply 101 to control its output. For example, the power supply 101 can control the synchronization of the current waveforms as further discussed below. Exemplary embodiments can include inverter-type or transformer-type power supplies, with similar topologies used for providing a pulse welding signal. Of course, a smaller power output is needed for the magnetic field power supply than a typical pulse welding power supply.

In embodiments of the present invention the probe 107 is positioned proximate to the welding arc 115 such that the magnetic field 109 can influence the arc 115 and the droplet 117 while the droplet 117 is in flight. Embodiments of the present invention synchronize the generation of the magnetic field 109 and the pulse welding waveform so that an optimized welding operation can be achieved. By synchronizing the generation of the magnetic field 109 with the arc 115 and droplet transfer an optimized welding operation can be achieved, particularly when trying to obtain specialized weld joints. This synchronization will be discussed in detail below.

As shown in FIG. 1, the torch 111 is not centered above the weld joint of the work pieces W. This may be needed for any number of reasons, for example an obstruction near the weld joint. Thus, a single magnetic field generation device 105 is used to steer the arc 115 and the droplet 117 to one side of the weld joint during welding. That is, the magnetic field power supply 103 provides a current to the device 105 which is synchronized with the welding waveform generated by the welding power supply 101. The generation of the magnetic field 109 causes the arc to move to the side and the movement of the arc can cause the molten droplet 117 to be placed at a location different than directly under the contact tip 111 and filler 113.

Figure 2A:
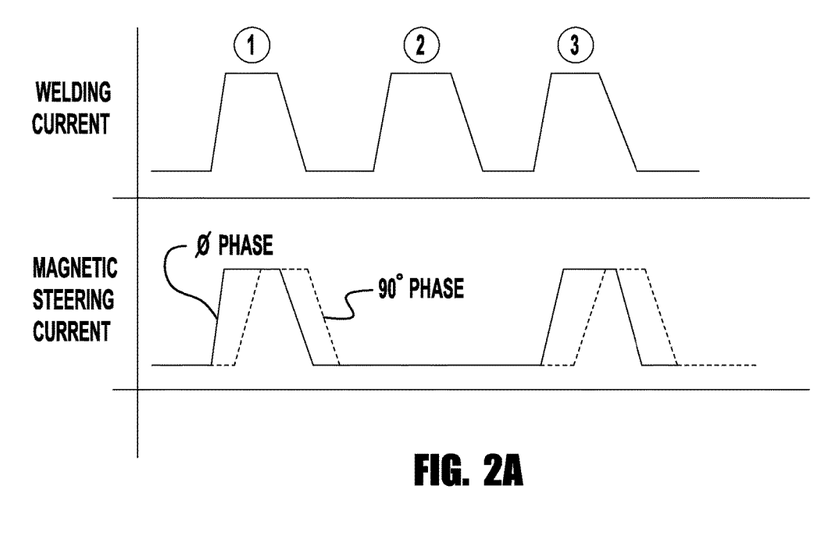
FIGS. 2A-2B illustrate diagrammatical representations of welding and magnetic steering waveforms in accordance with exemplary embodiments of the present invention.

FIG. 2A depicts an exemplary welding and magnetic field waveform which can be used in an embodiment with a single magnetic device 105. As shown the current is a pulsed waveform having a plurality of current peaks 1, 2, and 3. As is generally known, in many pulse welding operations, the molten droplet 117 separates from the filler 113 during the peak current. As such, in some embodiments the magnetic steering current is in phase with the welding current such that each of the welding and magnetic field currents start to rise and peak at the same time. In such an embodiment, the magnetic field 109 will be at full strength prior to the droplet 117 separating from the filler wire 113. Also, as shown, in some exemplary embodiments the magnetic steering current does not pulse with every welding current pulse. In the embodiment shown the steering current will be pulsed every other welding pulse (pulses 1 and 3). In such an embodiment, during welding some droplets 117 will impact the weld puddle in a first position while other droplets 117 will impact the puddle in another area. This allows the filler 113 to be deposited at various locations in the weld puddle. Of course, embodiments of the present invention are not limited to pulse the steering current at every other welding pulse, but different pulsing counts can be used. For example, it is contemplated that the steering current can be pulsed for 10 consecutive welding pulses and then be turned off for the next 10 welding pulses. In other embodiments, the number of pulses can be varied as needed. Also, in the embodiment shown the duration of the steering current pulse is the same as that of the welding pulse. However, in other embodiments that may not be the case as the steering pulse can be longer or shorter as needed.

As also shown in FIG. 2A, the steering pulse can be out-of-phase with the welding pulse. Specifically, it is contemplated that the steering pulse can be out-of-phase with the welding pulse by 45 to 135°. In some embodiments of arc welding, the droplet 117 does not separate from the wire 113 until near the end of the welding pulse peak, and the droplet 117 is still in flight as the arc current is decreasing. In such embodiments, the steering current can be pulsed out-of-phase (dashed line in FIG. 2A) with the welding pulse so that the magnetic field 109 is only generated when the droplet 117 has broken free, or when the droplet 117 is at its breaking point. In such embodiments the field 109 does not interfere with the arc 115 prior to the breaking and is at its peak while the droplet is in flight. Also, by having the steering current out-of-phase the magnetic field 109 will be at its peak even while the arc current is dropping but while the droplet is still in flight. In some embodiments the steering current remains at its peak current until the arc current reaches its background level.

Figure 6:
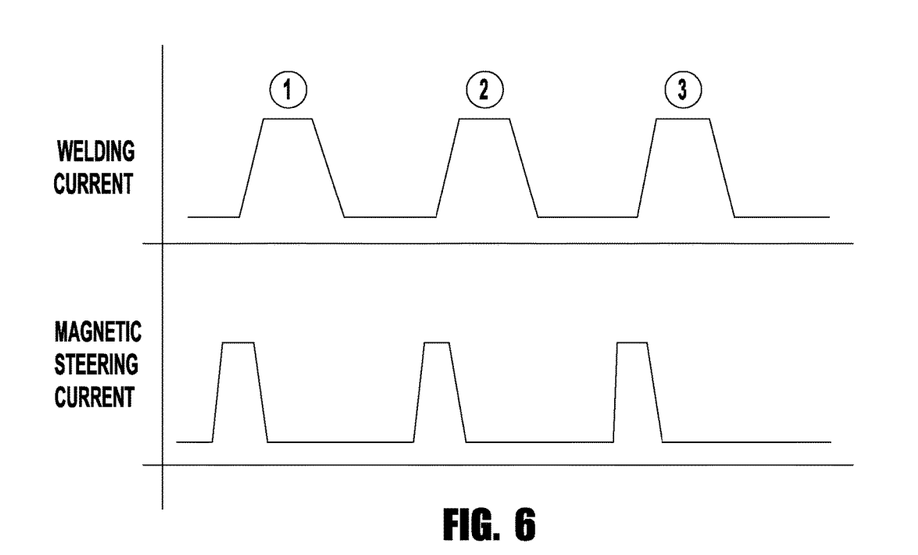
FIG. 6 illustrates a diagrammatical representation of a welding and magnetic steering waveform in accordance with an additional exemplary embodiment of the present invention.

In another exemplary embodiment, the steering current can be 180 degrees out-of-phase with the arc welding current. In such embodiments, the magnetic field 109 is not used to move the droplet 117 during flight, but is used to control the weld puddle, to elongate the weld puddle, or pre-clean the work piece surface. For example, the magnetic device 105 and probe 107 can be positioned either in front of, or behind, (in the travel direction) of the tip 111. In such an embodiment, the magnetic field 109 can move the arc forward or behind as needed to elongate the weld puddle. For example, the arc can be deflected (without a droplet in the arc) forward so that the heat of the arc removes any coatings or surface contaminants before the droplet 117 is passed to the weld puddle. Similarly, the arc can be deflected backwards so that the weld puddle is elongated for a desirable cooling or solidification profile. FIG. 6 is an exemplary cleaning waveform as described above. As shown the magnetic steering current is pulsed such that it begins prior to the arc welding pulse but ends before a point at which the droplet 117 releases from the wire 113. Further this embodiment shows that the steering current is provided for every welding current pulse. However, in other embodiments this cleaning pulse can be energized every N arc welding pulses, or after a given duration of time.

In further exemplary embodiments of the present invention, the steering current either begins or reaches its peak after the droplet 117 has contacted the weld puddle and before the following droplet 117 has been released. In additional exemplary embodiments the steering current pulse is started at the same time or after, the welding current reaches a background level. Further, the steering current pulse can be turned off or reach a background level prior to the next welding current pulse beginning.

Figure 2B:
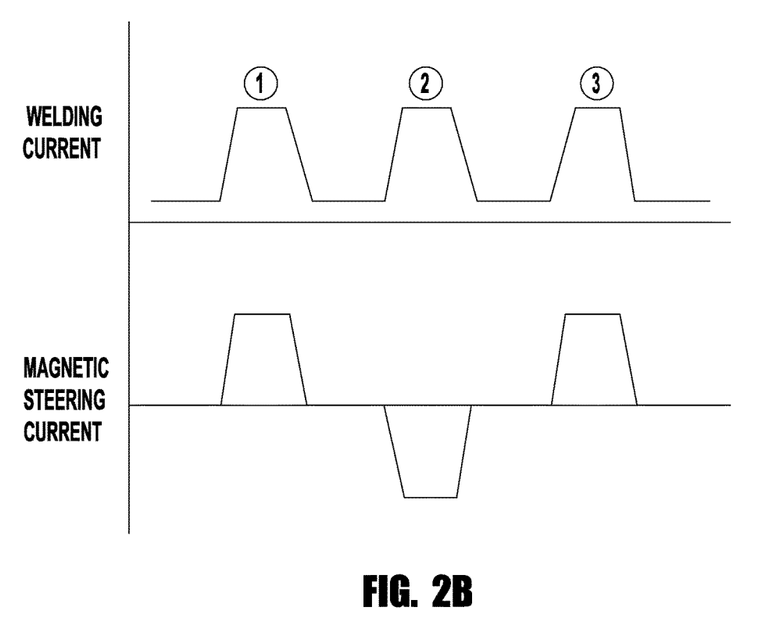

FIG. 2B depicts a similar welding waveform as that shown in FIG. 2A, except in this embodiment the magnetic steering current is an alternating current. In embodiments such as this the power supply 103 is an AC power supply and the change in polarity of the current changes the direction of the magnetic field, which—in turn—changes the direction of movement of the arc. Thus, the field 109 can be alternating such that a single probe 107 can cause the arc 115 to sweep across a weld joint during welding. For example, in an exemplary embodiment the wire 113 is positioned over the center of the weld joint and the magnetic field 109 can be changed by using an alternating current to move the arc from one side of the joint to the other as needed. The control and operation of embodiments of the present invention using an AC signal for the magnetic steering current is similar to that described herein as to the other discussed embodiments. Of course, the frequency, peak amplitudes and shape of the AC magnetic steering waveform can be altered as needed to performed the desired welding operation, as described herein. Such an embodiment can cause a zig-zag or serpentine pattern to be followed by the welding arc along the length of the weld bead as the operation travels along the weld joint.

Figure 3:
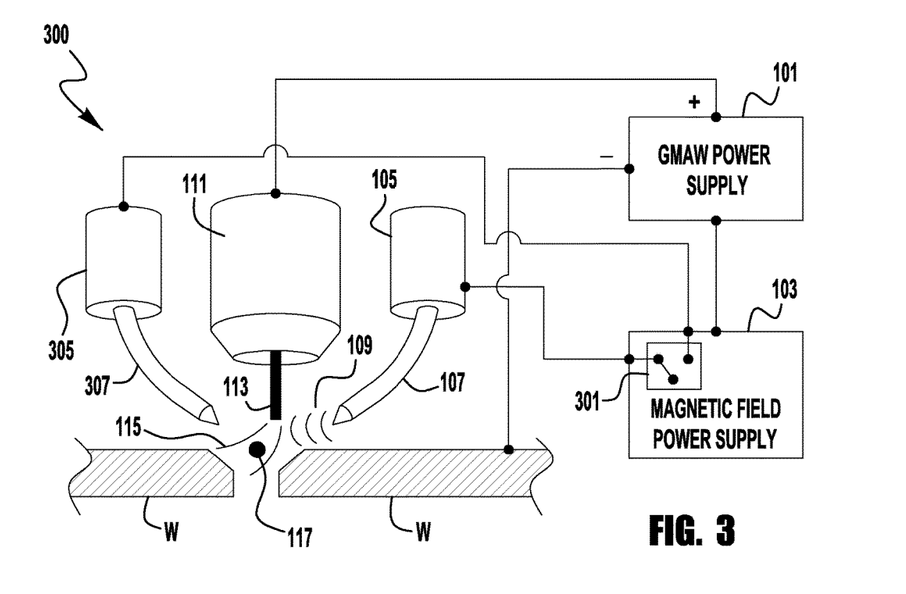
FIG. 3 illustrates a diagrammatical representation of welding system in accordance with another exemplary embodiment of the present invention.

FIG. 3 depicts another exemplary embodiment of a welding system 300 of the present invention. In this embodiment there are at least two magnetic devices 305 and 105. The magnetic device 305 also has its own probe 307. Each of the devices 105/305 is positioned near the contact tip 111 such that their respective magnetic fields can affect the welding arc 115. The devices 105/305 can be positioned as desired around the contact tip 111. In exemplary embodiments, the devices 105/305 are co-linear and can be either positioned in line (in the travel direction) with the welding operation (front-to-back orientation), or normal to the travel direction (side-by-side orientation—as shown in FIG. 3). In the embodiment shown in FIG. 3, the devices are in a side-by-side configuration such that their respective magnetic fields can move the arc 115 across a weld joint. As described above, the magnetic fields from the respective devices 105/305 can be used to control the location of the arc 115 and/or the flight of the droplet 117 during the welding operation. Thus, in such an embodiment the arc 115 can be moved to at least three different locations so as to direct the droplet 117 to those locations. For example, during some portion of the welding the droplet 117 can be directed to a left side of the weld joint, then for another portion of welding the droplet can be directed to the center of the joint (no magnetic fields activated) and then for another portion of the welding the droplet 117 can be directed to a right side of the joint.

In the system shown, the magnetic field power supply 103 has a switching circuit 301 which switches the magnetic steering current to the different magnetic devices 105/305 such that the appropriate magnetic field is energized. For example, the switching circuit 301 can be controlled such that the steering current is alternated between each device 105/305 for every welding current pulse. Of course, in other embodiments the switching circuit 301 can be controlled such that the steering current is directed to one device 105 for a set duration of time, or for a number N of welding current pulses. For example, the switch 301 can direct the steering current to the device 105 for 10 welding current pulses, and then to the device 305 for the following 10 pulses, etc. The switching circuit 301 can be controlled via various means. For example, the magnetic steering power supply 103 can be coupled to the welding power supply 101 such that the timing or control signals used to control the welding arc waveform can be used to also control the magnetic field power supply 301. In some embodiments the welding waveform timing circuits can be used to control the switch 301.

Figure 4:
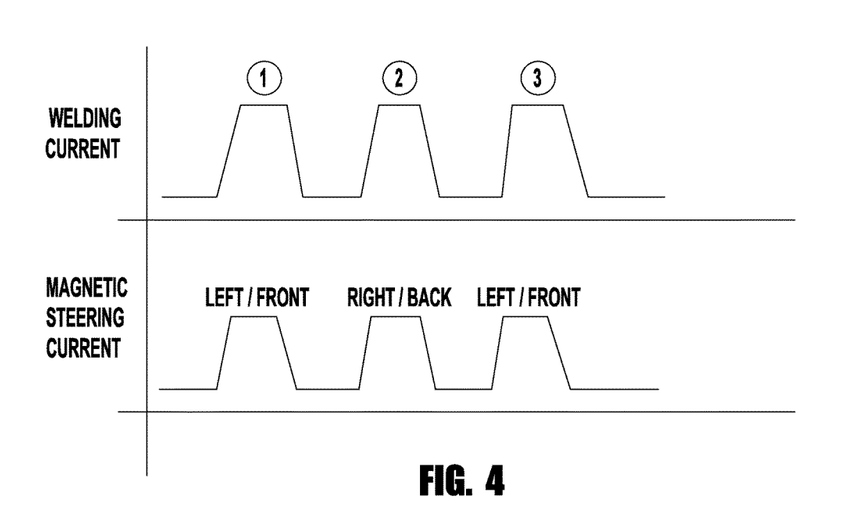
FIG. 4 illustrates a diagrammatical representation of a welding and magnetic steering waveform in accordance with another exemplary embodiment of the present invention.

FIG. 4 shows exemplary waveforms for both the welding current and magnetic steering current which can be used with a system as shown in FIG. 3. As shown, the welding current has a series of pulses 1, 2, 3 . . . , as does the magnetic steering arc. However, some of the magnetic steering pulses can be directed to one of the devices 305/105 (positioned left or front) and then other of magnetic steering pulses are directed to the other of the devices 305/105 (positioned right or back). In FIG. 4, a magnetic steering pulse is provided for each welding arc pulse, however other embodiments can employ a control where some arc welding pulses are skipped, similar to that shown in FIG. 2A. Also, the embodiment shown in FIG. 4 shows that the steering current is in phase with the arc welding current. Of course, in other embodiments the steering current can be out-of-phase as described with respect to FIG. 2A, and/or can be an AC waveform.

Figure 5:
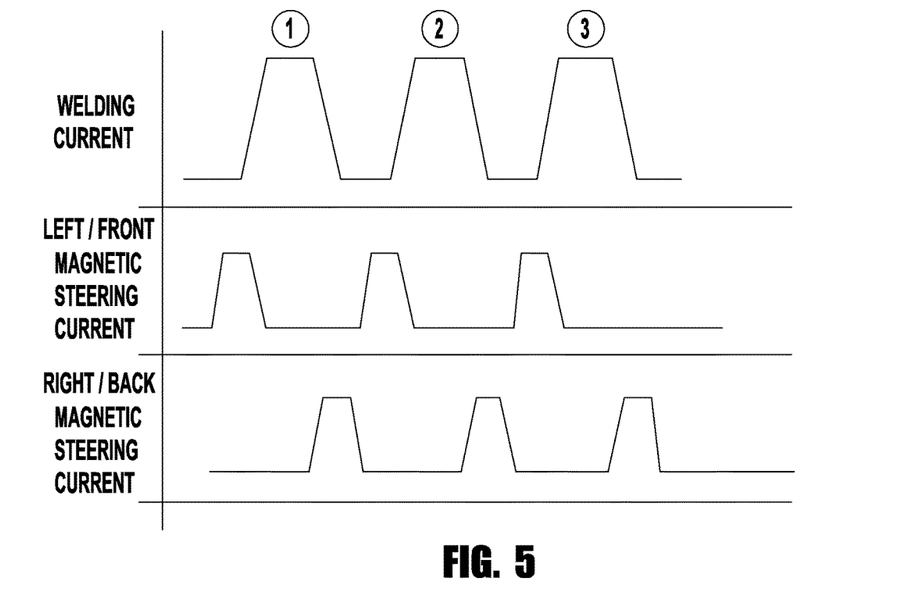
FIG. 5 illustrates a diagrammatical representation of a welding and magnetic steering waveform in accordance with a further exemplary embodiment of the present invention.

FIG. 5 depicts another exemplary embodiment of current waveforms that can be used with the system 300 shown in FIG. 3, where the different devices 105/305 can be activated at different times during a welding current pulse. As shown, the left or front magnetic device 105/305 can be activated at the beginning of the arc welding pulse, while the right/back magnetic device 105/305 is activated at the end of the pulse to direct the droplet 117 to the desired location. Further, as with FIG. 2B, either one, or both, of the magnetic steering currents can be AC.

Figure 7:
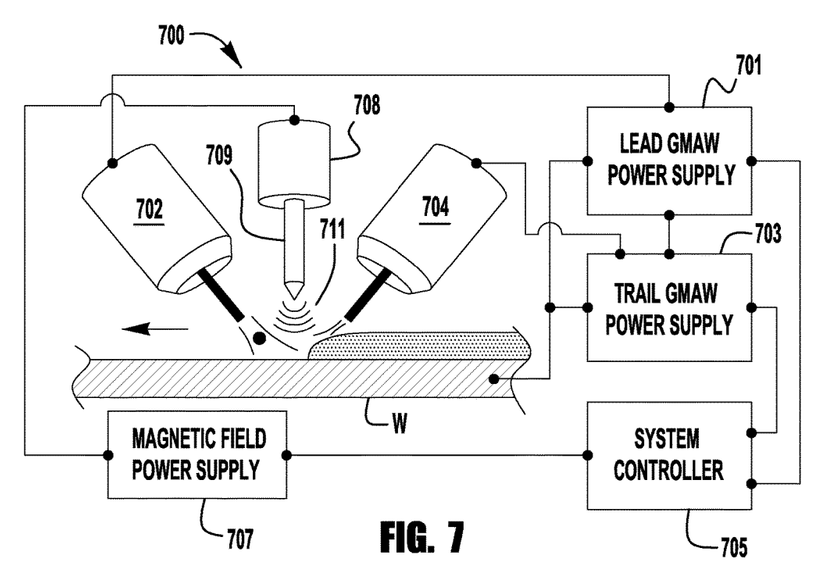
FIG. 7 illustrates a diagrammatical representation of welding system in accordance with a further exemplary embodiment of the present invention.

FIG. 7 depicts another welding system 700 in accordance with an exemplary embodiment of the present invention. In this exemplary embodiment a magnetic steering device 708 with a magnetic probe is positioned adjacent to (and in the embodiment shown—between) two welding torches 702/704 which are welding with a GMAW welding process. The lead torch 702 is powered by a lead power supply 701 and the trailing torch 704 is powered by a trailing power supply 703. In the embodiment shown both power supplies are GMAW type power supplies. However, other exemplary embodiments can use different types of pulse welding power supplies, such as GTAW type power supplies. The magnetic device 708 is powered by a magnetic field power supply 707 which provides a magnetic steering current to the device 708 to create a magnetic field 711 from the probe 709. Each of the welding power supplies 701, 703 and the magnetic field power supply 707 are coupled to a system controller 705 which controls an operation of each of the power supplies.

In such a tandem arc welding configuration, it is known that the welding arc current pulses of the leading and trailing waveforms are alternated so that the arcs and droplet transfer from the respective torches 702/704 do not interfere with each other. However, it is also known that in such welding configurations arc interference can often occur between the leading and trailing arcs such that arc blow, and similar problems, can occur. To mitigate this, embodiments of the present invention employ the magnetic device 708 to generate a magnetic field 711 between the respective welding pulses of the leading and trailing welding operations.

Figure 8:
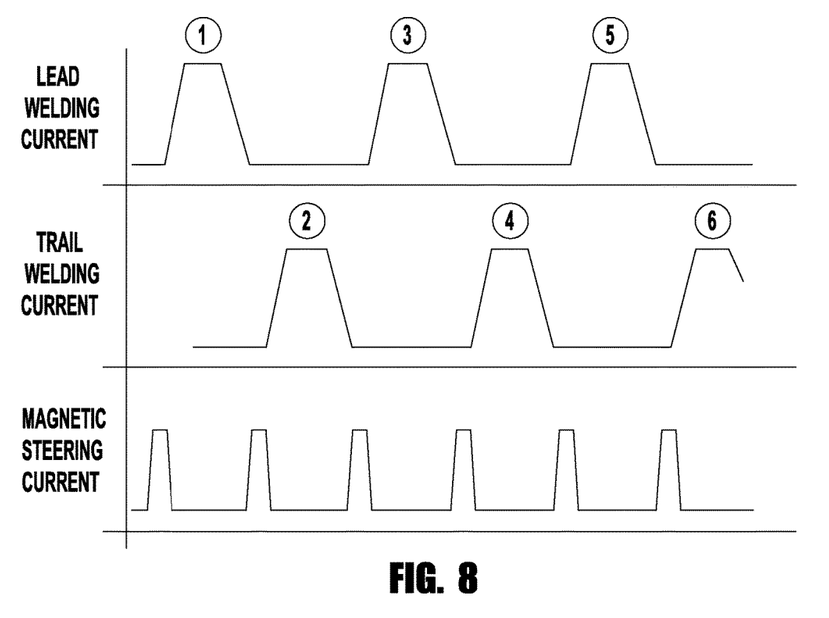
FIG. 8 illustrates a diagrammatical representation of a welding and magnetic steering waveform in accordance with an additional exemplary embodiment of the present invention.

This is depicted in FIG. 8, where the magnetic steering current is pulsed in between the lead and trailing welding pulses. In this embodiment the magnetic field 711 is generated between each of the lead and trailing welding pulses 1, 2, 3, 4, 5, 6, . . . . The presence of the magnetic field 711 between the welding pulses aids in stabilizing the arc plasma between welding pulses. In the embodiment shown, each of the magnetic field pulses occur during the background current between the arc welding pulses. However, in other exemplary embodiments the magnetic field pulse can overlap portions of the arc welding pulses as needed to stabilize the welding operation and mitigate arc blow.

In other exemplary embodiments of the system 700, the system controller 705 can use feedback from the welding operation, which may include feedback from the welding power supplies 701/703, to turn on and/or off the device 708. For example, in some welding operations it may not be necessary to have a magnetic field generated between each alternating weld pulse. However, the controller 705 determines when an arc blow condition, or arc stability condition, is present during welding and using this feedback activates the magnetic field power supply 707 to utilize the magnetic field 711 to regain stability of the welding operation. For example, the system controller can use current feedback information from either one, or both, of the lead and trailing welding power supplies to determine the need for the magnetic field 711 for stabilization. Further, the welding state logic in either one, or both, of the power supplies can react to arc instability and can cause the magnetic field to be enabled and/or changed based on the detected instabilities.

Figure 9:
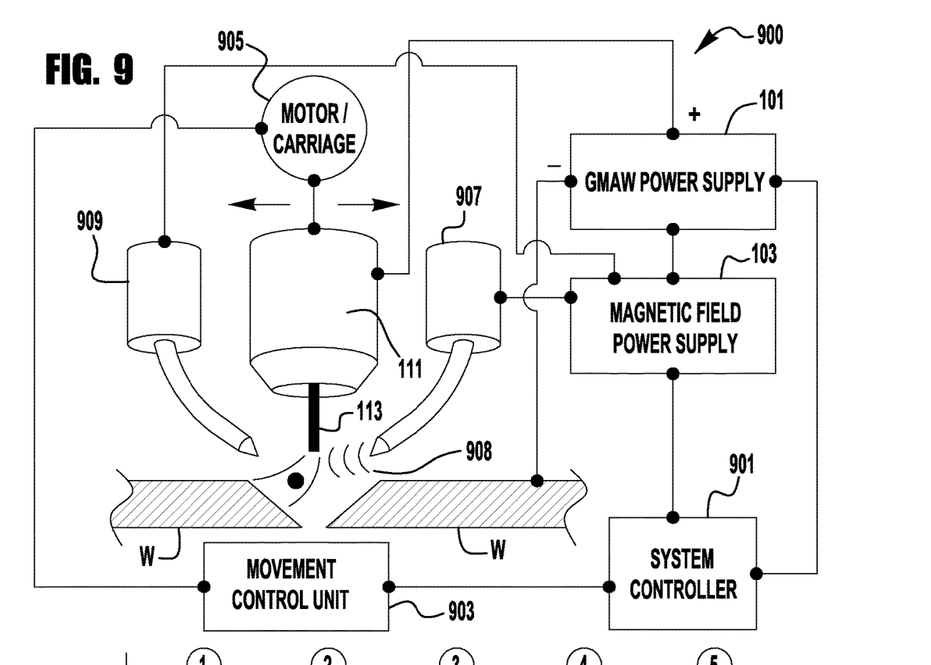
FIG. 9 illustrates a diagrammatical representation of welding system in accordance with an additional exemplary embodiment of the present invention.

FIG. 9 depicts another exemplary embodiment of a welding system 900 in accordance with an embodiment of the present invention. The system 900 shows an exemplary embodiment where the torch 111 can be translated, with respect to the weld bead, during welding. Of course, in embodiments of the present invention either the torch 111 or the work piece W is moved to create the weld bead. Such movement is co-linear with the weld joint. However, in the system 900 the torch 111 is also translated across the weld joint during the welding operation. That is, the torch 111 is moved perpendicular or diagonally to the centerline of the weld joint. Such an embodiment can allow for specialized weld joints to be created or to weld wider joints. FIG. 9 shows an embodiment where the torch 111 is moved with respect to the work piece W during welding, however, in other exemplary embodiments the work piece can be moved during welding.

As shown in FIG. 9, the embodiment uses a motor/carriage device 905 to provide the movement of the torch 111 during welding. The movement can be longitudinal with the weld joint or transverse to the weld joint. Of course, the motor/carriage device 905 can also be coupled to the work piece to move the work piece during welding. The motor/carriage device 905 is coupled to a system controller 901 which controls the movement during welding. In this embodiment there are two magnetic devices 907 and 909 on either side of the torch 111. (The devices 907/909 can also be positioned front-to-back, or as needed). Each of the magnetic devices 907/909 are coupled to a magnetic field power supply 103 as described above, similar to that discussed with respect to FIG. 3, so that a magnetic field 908 can be generated by either magnetic device. Further, the devices 907/909 can be secured to the torch such that their respective probes remain equidistant to the filler wire 113 during welding, or the devices 907/909 can be secured such that the torch 111 translates between the devices 907/909 so that the distance between the filler wire and the devices 907/909 changes during welding.

During welding the torch 111 is translated with respect to the weld joint so that the filler wire 113 is moved across the weld joint. The system controller 901 uses the positional information of the torch 111 with respect to the weld joint to control the output of the magnetic field power supply 103 and/or the welding power supply 101. That is, the output of the power supplies 101/103 can vary based on the position of the torch with respect to the weld joint. Specifically, based on the lateral position of the torch 111 with respect to the joint the output current of the magnetic field power supply 103 can vary to create a magnetic field with a variable strength based on welding position.

Figure 10:
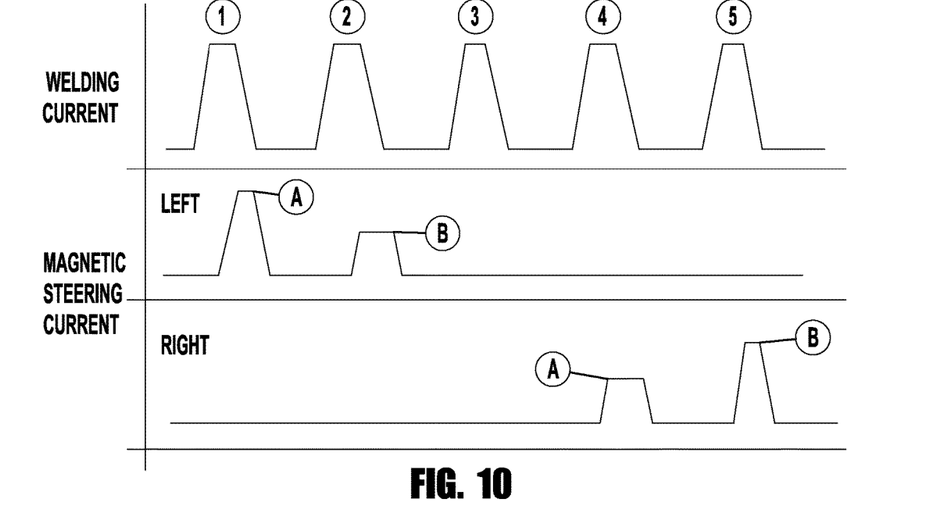
FIG. 10 illustrates a diagrammatical representation of a welding and magnetic steering waveform in accordance with a further exemplary embodiment of the present invention.

An example of such an output is shown in FIG. 10, where a series of five welding pulses are shown. For purposes of simplicity it is presumed that each of the welding current pulses shown in FIG. 10 is at a different lateral position in the welding process. Of course, it is recognized that in application this may not be the case as multiple welding current pulses can, and often will, occur at the same lateral position. For example, there can be any number N of pulses at each lateral welding position and embodiments of the present invention are not limited in this way. Turning back to FIG. 10, it is seen that at the first welding pulse 1 the torch 111 is at a first welding position and the magnetic steering current from the power source 103 is directed to the left magnetic device 909 at a first magnitude A to create a magnetic field having a first strength. It is noted that FIG. 10 depicts a waveform relationship where the magnetic steering pulse begins at a time period T after the welding current reaches its peak. As explained previously, in some embodiments it may be beneficial to have the magnetic field reach its maximum strength near the end of the peak welding current pulse so as to focus its effect on the flight of a droplet. Of course, other embodiments can use different timing for the peak magnetic field without departing from the spirit and scope of the present invention, as described previously.

Following the first pulse 1, at a second lateral position a second welding pulse 2 is provided. At this position the same left magnetic device 909 is used but creates a magnetic field with a different magnitude because the steering current is at a different level B. In the embodiment shown, this can be a situation where the second pulse 2 takes place at a lateral position closer to the center of the weld joint than the first pulse 1. Thus, as the torch moves closer to the center of the joint, the magnetic field strength decreases to place the droplet at the desired position. Of course, in other embodiments the magnetic field can be stronger as the torch moves closer to the center of the joint. At the third welding pulse 3 the torch 111 is positioned at the center of the joint and at this position there is no magnetic field generated by either of the devices 907/909 thus allowing the droplet to be placed at the center of the joint. Then as the torch 111 moves to the right of the joint the right-hand device 907 will generate a magnetic field at pulses 4 and 5 (two different positions) and as discussed above the magnetic field strength will vary based on the position. Thus, embodiments of the present invention can control the strength and orientation of the magnetic fields used to steer the welding arc based on the relative position of the welding torch 111 with respect to the weld joint. Further, as described above, the steering waveform can be AC or can have opposite polarity portions which are used to control the droplet flight during welding. For example, in some exemplary embodiments the steering waveform may not be a constant AC waveform, but can use opposite polarity current portions to control the flight of the droplet or the arc when certain events, such as a short circuit, are detected. Thus, in some embodiments the magnetic field current can have an opposite polarity for each following pulse, or a series of pulses can be provided at a first polarity (direction) followed by a series of pulses having an opposite polarity (direction). Exemplary embodiments of this control methodology will be discussed in more detail below.

Figure 11:
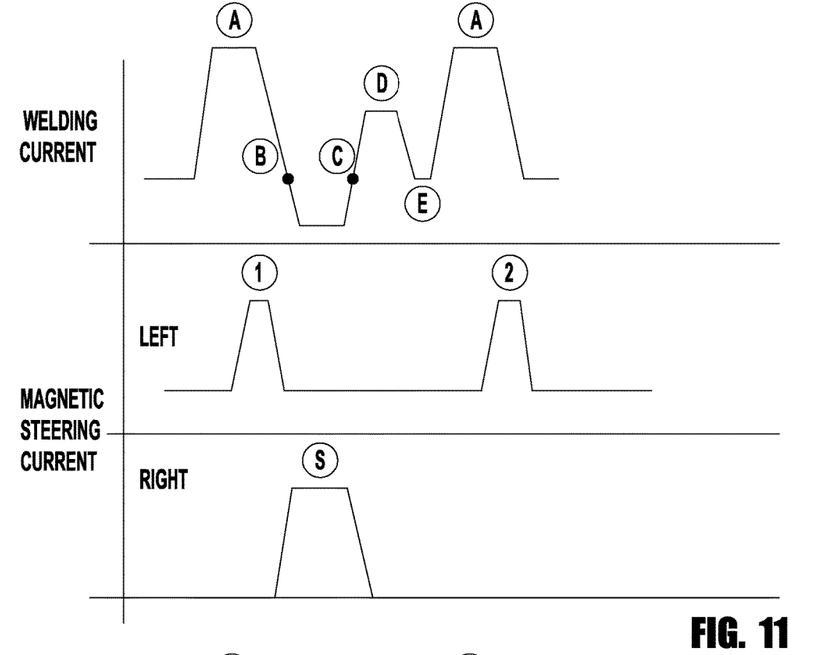
FIG. 11 illustrates a diagrammatical representation of a welding and magnetic steering waveform in accordance with an additional exemplary embodiment of the present invention with a short circuit present.
Figure 12:
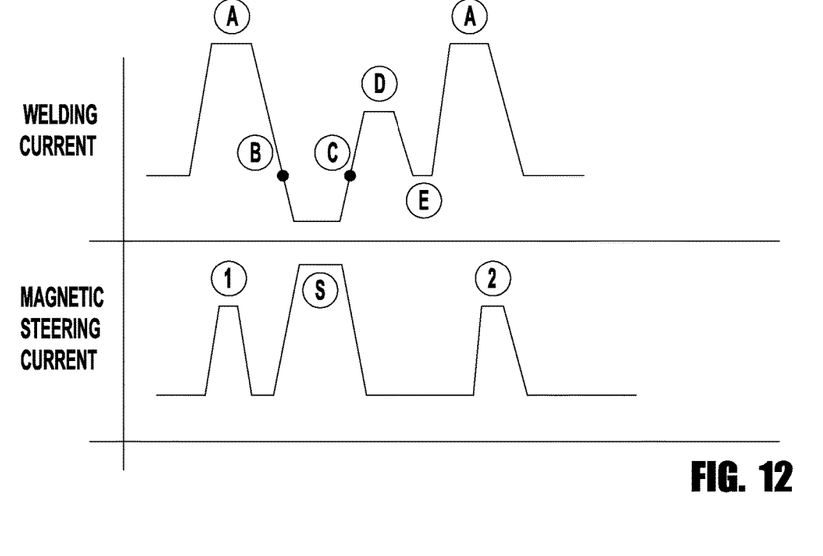
FIG. 12 illustrates a diagrammatical representation of a welding and magnetic steering waveform in accordance with a further exemplary embodiment of the present invention with a short circuit present.

Turning now to FIGS. 11 and 12, not only can embodiments of the present invention be used to control the flight of the droplet and/or the arc positioning during welding, but embodiments can also be used to aid in the clearing of a short circuit during welding. FIGS. 11 and 12 depict waveforms to be used in a short circuit clearing operation and each will be discussed in turn. It is noted that although these embodiments are shown using a single polarity magnetic steering current, an AC or changing polarity current can also be used in exemplary embodiments of the invention. As described herein, the direction of current will affect the movement of the arc and as such the polarity and magnitude of the current can be used to control the arc/droplet flight as described herein. Embodiments of the present invention are not limited using single polarity magnetic steering currents.

FIG. 11 depicts an embodiment where a magnetic steering current is being used from a left side of the welding arc to control the flight of the droplet. Again, as shown the magnetic steering current reaches its peak at a time T after the welding current pulse reaches its peak. During welding a welding current peak A is reached and then the magnetic steering current is activated to steer the droplet as desired. However, in this embodiment during welding a short circuit occurs causing the filler wire 113 to make contact with the work piece W, this is generally shown at point B where the current drops below the background level. Once the short circuit is detected the system controller (for example 901) directs a magnetic field to be created by the right hand magnetic field device (for example 907). The force from this magnetic field will aid in "pushing" the welding arc and molten droplet or filler 113 away from contacting the work piece W to aid in quickly clearing the short circuit. During the short circuit the magnetic field generated by the pulse S is maintained until when the short is cleared (at point C) or sometime after the short has cleared (at point D). Then the welding current can return to its background level E and start the next welding pulse A. Of course, other embodiments of the present invention can use different durations and magnitude of the short clearing magnetic pulse S and still remain within the scope of the present invention. In the embodiment shown in FIG. 11 the first magnetic field generation device is generating the magnetic field pulses 1 and 2 for directing the droplet while the opposing magnetic field generation device (right) is used to aid in clearing the short. FIG. 12 depicts a similar use of a magnetic field to clear a short but rather the same magnetic field generation device is used to clear the short. In some embodiments like that shown in FIG. 9, the positional information regarding the torch 111 can be used to determine which magnetic field generation device 907/909 will be used to clear the short. For example, if the torch 111 is positioned on the left side of the weld joint the left device 909 can be used to clear the short as it will tend to drive the arc to the center or the work piece and away from a sidewall of the work piece W which may have caused the short. Similarly, if the torch 111 is positioned to the right of the center of the weld joint the right device 907 can be used to generate a short clearing magnetic field to move the arc away from the right side of the weld joint. Of course, other embodiments can be envisioned and controlled as needed.

As shown in FIG. 12, it is also contemplated that the magnetic short clearing pulse S can have a magnetic peak magnitude and/or duration which are different than the magnetic pulse 1, 2 used to direct the travel of the droplet during welding. In FIG. 12 the short peak S is higher and longer than the steering peaks 1, 2. In other embodiments, different relationships can be used. Of course, it should be noted that the higher the peak magnetic current the stronger the resultant magnetic field, such that the magnetic fields of the short clearing pulse S can be higher and longer than that of the steering magnetic pulses.

Various methods of control will now be discussed. The following discussion of exemplary embodiments is intended to be representative as other methods of control can also be employed without departing from the spirit and scope of the present invention. Exemplary embodiments of the present invention can use various methods of controlling and/or synchronizing the generation of the magnetic field to steer the arc and/or control the flight of a molten droplet passing through the arc. Some exemplary methods can use synchronization between the welding waveform and the magnetic field current, while others can use the real time detection of events occurring during the welding operation, each of which will be discussed below. It is noted that because the construction and operation of control signal circuitry, timing circuitry, short circuit detection circuitry, welding feedback circuitry and control are generally known, for the control of current signals in welding power supplies, a detailed discussion of these circuits will not be provided herein. However, these similar circuits and control methodologies can be implemented in the system controllers and/or magnetic field power supplies discussed herein to control the generation of magnetic steering current, as described below.

In a first exemplary embodiment, the magnetic field power supply (e.g., 103) can be energized at the same time as the welding power supply (e.g., 101) using the same or similar control signals used by the welding power supply. For example, when a signal is generated by the welding power supply 101 to generate a welding pulse, that signal is shared with the magnetic field power supply which simultaneously causes a magnetic field current to be supplied to the magnetic device 105. In such an embodiment an on/off signal can be generated to control the magnetic steering current. Thus, the generation of the magnetic field will be in phase with the welding pulses. In other embodiments (as discussed above) it may be desirable to have the magnetic field generation out-of-phase with the welding pulses. In such embodiments the magnetic field power supply 103 and/or the welding power supply 101 can have a timing circuit which delays the creation of magnetic steering current (and thus magnetic field) by a time T after a welding pulse is generated. For example, in some exemplary embodiments the magnetic steering current can be delayed by 5 to 20 ms after the beginning of the welding pulse. Of course, other embodiments may use different timing delays.

In other exemplary embodiments, as explained above, the control circuitry in the welding power supplies generates a magnetic field current prior to the generation of a welding pulse by a time T. Again, timing circuitry can be employed in any of the welding power supply, magnetic field power supply and system controller to ensure the proper timing of the magnetic field relative to the welding pulse.

In another exemplary embodiment of the present invention, a shared state table based waveform control system can be used. The use of state table controls for welding waveforms are generally known, for example the Power Wave® welding power supply, manufactured by The Lincoln Electric Company of Cleveland, Ohio, uses such a control methodology. In an exemplary embodiment, the control and synchronization of the magnetic field current signal is integrated into the welding waveform state table such that the state table controls the operation of both the welding power supply and the magnetic field power supply. For example, when real time welding feedback is received by the welding power supply, including for example, arc voltage, arc current, arc power, output voltage, output current, wire feed speed, etc., the common state table provides operating instructions to both the welding power supply and the magnetic field power supply based on the real time feedback.

In a further exemplary embodiment, a parallel state table is created for the operation of the magnetic field power supply 103 such that a welding state table controls the operation of the welding power supply 101 while a parallel magnetic field state table controls the operation of the magnetic field power supply 103. As described above, in such an embodiment, the magnetic field power supply 103 can share the welding feedback and control signals from the welding operation, such as arc current, arc voltage, arc power, output voltage, output current, wire feed speed, output power, etc. Based on this real time feedback information the parallel state table for the magnetic field power supply 103 determines an appropriate magnetic field intensity, phase, frequency, timing, peak duration, etc. of the magnetic field current signal and the magnetic field power supply 103 generates the appropriate magnetic field current.

In further exemplary embodiments, the parallel state table can take into account the lateral positioning of the welding torch 111 during the welding operation in determining the appropriate parameters for the magnetic field current signal or magnetic field. As stated above, embodiments of the present invention can vary the magnetic field based on the movement of the torch with respect to the weld joint. Thus the control state table of the magnetic field power supply 103 can also take into account the positioning of the welding torch 111 during welding. That is, the control state table of the magnetic field power supply can take into account the x, y and z coordinates of the welding torch, with respect to the work piece, to determine the desired magnetic field intensity, duration, frequency and phase.

In a further exemplary embodiment, the control state table for the magnetic field power supply contains control parameters which are triggered when a short circuit is detected. In such embodiments, when a short circuit is detected by the welding power supply 101 this feedback is also provided to magnetic field power supply 103. Based on the detected short the magnetic field power supply 103 provides a magnetic field current to a magnetic field device (e.g., 105) to aid in clearing the short. For example, in exemplary embodiments of the present invention, a control state table for the magnetic field power supply 103 receives feedback on the detection of a short circuit from the welding power supply 101 (or similar parallel feedback circuitry) and determines the intensity, duration and timing of a magnetic field based on that detected short. That magnetic field current is then provided to the appropriate magnetic steering device to aid in clearing the short. If there are multiple magnetic field generation devices, the state table can also determine which device should be energized. Furthermore, the state table can also take into account the positioning of the welding torch 111 at the time of the short circuit to determine the appropriate magnetic field parameters.

The exemplary embodiments of the welding system, as shown in the Figures, depicts the welding power supply, magnetic field power supply and system controller as separate components. However, this need not be the case as these components can be integrated into a single unit. Furthermore, the control hardware and software (for example a control state table) for the magnetic field can be found in any one of a welding power supply, system controller and/or a magnetic field power supply. Embodiments of the present invention are not limited in this regard, and can have a modular construction as well, where the components of the system are provided in separate but combinable modules.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding system, comprising:
a welding power supply which outputs a welding current signal to an electrode so that a welding arc is generated between said electrode and a workpiece, said welding current signal comprising a plurality of welding current pulses;
a magnetic steering device positioned adjacent to said welding arc; and
a magnetic field power supply which outputs a magnetic field current signal to said magnetic steering device, said magnetic field current signal comprising a plurality of magnetic current pulses;
wherein said magnetic steering device uses said magnetic field current signal to generate a magnetic field to move said welding arc during welding; and
wherein said plurality of said magnetic current pulses are synchronized with respect to at least some of said plurality of welding current pulses of said welding signal,
wherein said electrode is a consumable, and
wherein each of said at least some of said plurality of welding current pulses causes a molten droplet to separate from said consumable and wherein said plurality of magnetic current pulses are synchronized with said at least some of said plurality of welding current pulses of said welding signal so that said magnetic current pulses are at a peak level at least immediately prior to each of said molten droplets separating from said consumable.

2. The system of claim 1, wherein said welding power supply synchronizes said plurality of magnetic current pulses with said at least some of said plurality of welding current pulses.

3. The system of claim 1, wherein at least some of said plurality of magnetic current pulses have a peak level different from others of said plurality of magnetic current pulses.

4. The system of claim 1, wherein at least some of said plurality of magnetic current pulses have a different polarity from others of said plurality of magnetic current pulses.

5. The system of claim 1, wherein at least some of said plurality of magnetic current pulses are out-of-phase with said at least some of said welding current pulses by 45 to 135°.

6. The system of claim 1, wherein said welding current signal provides at least one additional current pulse between said at least some of said plurality of welding current pulses.

7. The system of claim 1, further comprising a second magnetic field power supply which outputs a second magnetic field current signal to a second magnetic steering device, said second magnetic field current signal comprising a second plurality of magnetic current pulses;
   wherein said second magnetic steering device is positioned adjacent to said welding arc and said second magnetic steering device uses said second magnetic field current signal to generate an additional magnetic field to move said welding arc during welding; and
   wherein said second plurality of said magnetic current pulses are synchronized with respect to at least some other of said plurality of welding current pulses of said welding signal.

8. The system of claim 1, wherein said magnetic field power supply provides an additional magnetic current pulse which is different from said plurality of magnetic current pulses when a short circuit between said electrode and said workpiece is detected by said welding power supply.

9. A welding system, comprising:
   a welding power supply which outputs a welding current signal to an electrode so that a welding arc is generated between said electrode and a workpiece, said welding current signal comprising a plurality of current pulses;
   a magnetic steering device is positioned adjacent to said welding arc; and
   a magnetic field power supply which outputs a magnetic field current signal to said magnetic steering device, said magnetic field current signal comprising a plurality of magnetic current pulses;
   wherein said magnetic steering device uses said magnetic field current signal to generate a magnetic field to move said welding arc during welding,
   wherein said plurality of said magnetic current pulses are synchronized with respect to at least some of said plurality of welding current pulses of said welding signal,
   wherein each of said at least some of said plurality of welding current pulses causes a molten droplet to separate from a consumable and wherein said plurality of magnetic current pulses are synchronized with said at least some of said plurality of welding current pulses of said welding signal so that said magnetic current pulses are at a peak level at least immediately after each of said molten droplets separate from said consumable, and
   wherein said consumable is said electrode.

10. The system of claim 9, wherein said welding power supply synchronizes said plurality of magnetic current pulses with said at least some of said plurality of welding current pulses.

11. The system of claim 9, wherein at least some of said plurality of magnetic current pulses have a peak level different from others of said plurality of magnetic current pulses.

12. The system of claim 9, wherein at least some of said plurality of magnetic current pulses have a different polarity from others of said plurality of magnetic current pulses.

13. The system of claim 9, wherein at least some of said plurality of magnetic current pulses are out-of-phase with said at least some of said welding current pulses by 180°.

14. The system of claim 9, wherein said welding current signal provides at least one additional welding current pulse between said at least some of said plurality of current pulses.

15. The system of claim 9, further comprising a second magnetic field power supply which outputs a second magnetic field current signal to a second magnetic steering device, said second magnetic field current signal comprising a second plurality of magnetic current pulses;
   wherein said second magnetic steering device is positioned adjacent to said welding arc and said second magnetic steering device uses said second magnetic field current signal to generate an additional magnetic field to move said welding arc during welding; and
   wherein said second plurality of said magnetic current pulses are synchronized with respect to at least some other of said plurality of welding current pulses of said welding signal.

16. The system of claim 9, wherein said magnetic field power supply provides an additional magnetic current pulse which is different from said plurality of magnetic current pulses when a short circuit between said electrode and said workpiece is detected by said welding power supply.

* * * * *